May 10, 1932.  R. D. KELL  1,857,154
TELEVISION RECEIVER
Filed April 1, 1930
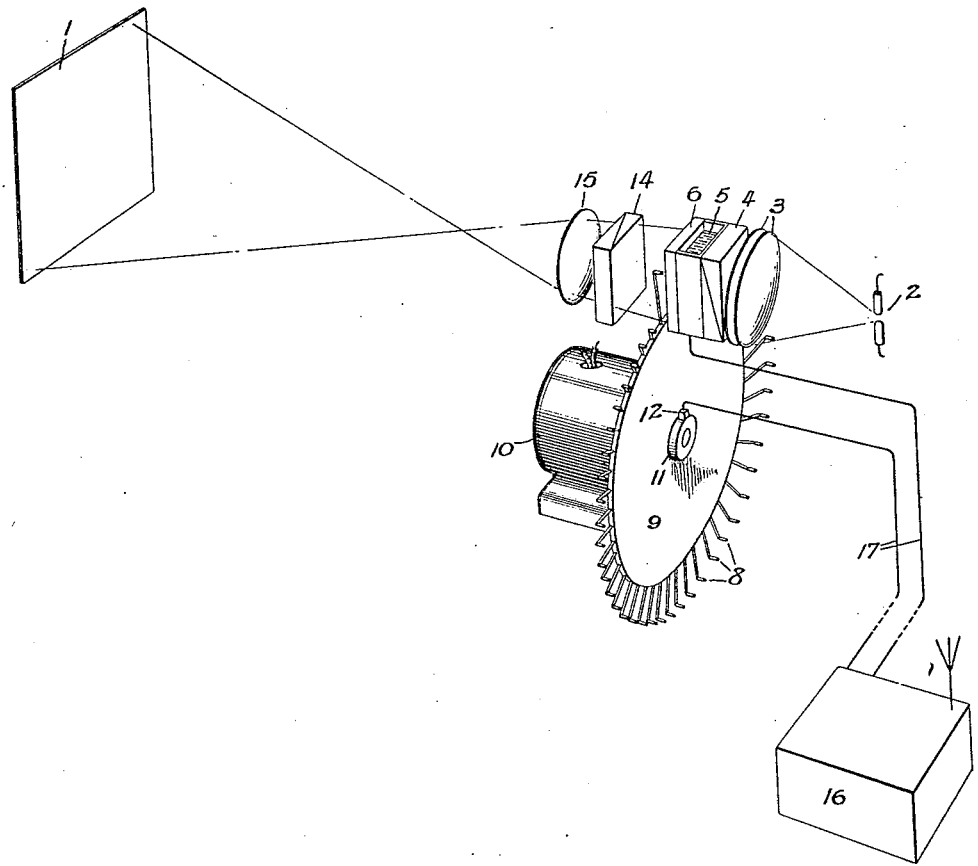
Inventor:
Ray D. Kell,
by Charles V. Tullar
His Attorney.

Patented May 10, 1932

1,857,154

UNITED STATES PATENT OFFICE

RAY D. KELL, OF SCOTIA, NEW YORK, ASSIGNOR TO GENERAL ELECTRIC COMPANY, A CORPORATION OF NEW YORK

TELEVISION RECEIVER

Application filed April 1, 1930. Serial No. 440,845.

My invention relates to television receiving apparatus and it is an object of my invention to provide an improved apparatus of this character which shall avoid certain limitations introduced by flicker and brilliancy common to television apparatus heretofore employed.

My invention will be better understood from the following description taken in connection with the accompanying drawing, and its scope will be pointed out in the appended claims.

Referring to the drawing in which the single figure illustrates in a more or less diagrammatic manner one embodiment of my invention, I have shown at 1 a screen upon which is received the picture or view being transmitted. Light for the illumination of the screen is furnished by the lamp 2 which for example may be an electric arc. Light from lamp 2 passes successively through the condenser lenses 3, the polarizer 4 which may be any suitable means, for example a Nicol prism where the light becomes polarized in one plane and thence through the transparent electrode 5 which, for example, may be alcohol, to the member 6. This member which is shown as a plate in contact with the transparent electrode 5 comprises a suitable material which becomes double refracting when placed under electric strain, an example of such a material being Rochelle salt. Cooperating with the plate 6 are a series of movable electrodes 8 carried by the disk 9 and having uniformly varying lengths, the end of each being turned toward the plate, whereby at each rotation of the disk the electrostatic field between the ends of the electrodes 8 and the plate 6 scan or cover a prescribed portion of the plate in a manner similar to scanning arrangements heretofore employed in television apparatus. The disk 9 is shown mounted on the shaft of the driving motor 10 by which the disk is rotated in synchronism with the sending apparatus. The disk is also shown having the hub or slip ring 11 which is engaged by the brush 12. Beyond the plate 6 and the moving electrodes 8 is the analyzing means 14, for example a Nicol prism, which is turned at right angles to the polarizer 4.

The objective lens 15 arranged beyond the prism 14 serves to produce an image of plate 6 upon the screen 1. The signal from the sending station may be transmitted in any desired manner. In the illustration I have shown at 16 apparatus for receiving an amplifying a signal sent by radio, connections being made therefrom by the conductors 17 to the fixed electrode 5 and to the moving electrodes 8 through the brush 12, slip ring 11 and disk 9.

When no signal is being received from the sending station, the screen is dark inasmuch as the polarizer and analyzer are turned so that no light is passed to the screen when the plate 6 is not under electric strain. When the signal is being received, successive portions of the plate 6 are subjected to an electric strain which is variable in accordance with the received signal. By reason of the double refractory property of the plate when under strain, the successive portions of the plate when viewed through the analyzer 14 appear to become luminous, the luminosity varying with the intensity of the received signal. By the use of the objective 15 a magnified image of the plate 6 is produced on the screen 1. An important property of the plate 6 is that it requires an appreciable time interval to recover from the electric strain thus prolonging the time during which each successive area thereof appears to be luminous and accordingly increasing the brightness of the image. For example, if pictures are being sent at the rate of sixteen per second, the plate 6 may be constructed to require nearly a sixteenth of a second to recover. Hence the screen at any instant will show substantially a complete picture rather than a single picture element. A variation in the time of recovery may be effected by varying the temperature of the plate.

I have shown the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. Television receiving apparatus comprising a member which becomes double refracting when put under electric strain, optical means associated therewith for rendering visible those portions thereof subjected to electric strain, and means for subjecting points of the member successively to electric strain varied in accordance with the received signal.

2. Television receiving apparatus comprising a member including a material which is double refracting when put under electric strain and which requires an appreciable time interval to recover from such strain, optical means associated therewith for rendering visible those portions of the member to which the strain is applied, and means by which points of the member may be subjected successively to electric strain varied in accordance with the received signal.

3. Television receiving apparatus comprising a plurality of light polarizing means having their axes arranged at substantially right angles, a member therebetween which becomes double refracting when put under electric strain, scanning means for subjecting points of said member successively to electric strain, means for projecting light through the polarizing means and said member, and means for applying to said scanning means a potential variable in accordance with the received signal.

4. Television receiving apparatus comprising a member which becomes double refracting when subjected to electric strain, optical means associated with said member for rendering visible those portions thereof subjected to such strain, scanning means comprising a plurality of electrodes for applying electric strain successively to points of the member, and means for applying a varying potential to the electrodes in accordance with the received signal.

5. Television receiving apparatus comprising a light source, a member which becomes double refracting when subjected to electric strain arranged in the path of light from said source, a plurality of polarizing devices arranged with their planes of polarization at right angles to each other and located at opposite sides of said member and scanning means comprising a plurality of movable electrodes for applying electric strain successively to portions of the member, and means for applying to said electrodes a potential which varies in accordance with the received signal.

6. Television receiving apparatus comprising a light source, a plate comprising Rochelle salt arranged in the path of light from said source, Nicol prisms arranged on opposite sides of said plate and turned relatively to each other to cut off all light tending to pass therethrough, a transparent electrode in contact with one face of said plate, a rotatable member having a series of electrodes adapted to scan the plate, a screen, and means for imaging the plate on the screen.

7. Television apparatus comprising a plate of material which becomes double refracting when subjected to electric strain, optical means for projecting a beam of polarized light through the plate at right angles thereto and scanning means arranged progressively to subject small portions of the plate successively to electric strain varied in accordance with the received signal.

8. Television apparatus comprising a plate of material which becomes double refracting when subjected to electric strain, optical means for projecting a beam of polarized light through the plate at right angles thereto and scanning means comprising an electrode arranged to move over the face of the plate and to subject successive portions of the plate to electric strain.

9. Television apparatus comprising a plate of material which becomes double refracting when subjected to electric strain, optical means for projecting a beam of polarized light through the plate at right angles thereto and scanning means comprising a rotatable member having a plurality of electrodes of progressively varying length arranged to move over the face of the plate and to subject successive small areas thereof to electric strain.

In witness whereof, I have hereunto set my hand this 31st day of March, 1930.

RAY D. KELL.